Feb. 23, 1960  R. E. CLAUSS  2,925,960
MANUFACTURE OF COIL CONDUCTORS
Filed Feb. 23, 1955

INVENTOR
RAYMOND E. CLAUSS
BY
ATTORNEY

United States Patent Office 2,925,960
Patented Feb. 23, 1960

2,925,960

MANUFACTURE OF COIL CONDUCTORS

Raymond E. Clauss, New Hyde Park, N.Y., assignor to Sperry Rand Corporation, a corporation of Delaware Application February 23, 1955, Serial No. 489,881

7 Claims. (Cl. 242—9)

The present invention relates to an improvement in the manufacture of coil conductors having predetermined electrical characteristics. It is particularly concerned with the assembly of artificial transmission lines having predetermined accurate time or phase delay characteristics.

It is often necessary to provide a time or phase delay of alternating voltage energy. One type of device known in the art for performing such a function comprises an artificial transmission line, i.e., an electrical network composed of concentrated sections of inductance and capacitance for simulating the characteristics of an actual transmission line.

One type of artificial transmission line known in the art is formed by winding an insulated wire in the form of a coil whose turns are in close relationship to a grounded concentric conductor. The turns of the coil are equivalent to a plurality of lumped inductors in series, the capacitance between such turns and the concentric conductor being equivalent to a plurality of lumped capacitors in shunt with the inductors. Such an arrangement will cause applied alternating voltage energy such as a series of recurrent pulses to be delayed by an amount which is a function of the square root of the product of the inductance and capacitance for each section of line comprising a coil turn, for example.

It has been difficult to form an artificial transmission line as aforedescribed for providing a predetermined desired time delay within specified limits. This is partially attributed to the fact that it is difficult to manufacture a line where the turns of wire are uniformly wound so as to have a constant relationship relative to each other and the concentric conductor adjacent thereto. The foregoing together with inherent variations in the thickness of the insulation about the wire cause the capacitance and/or inductance per unit length of an artificial transmission line to be slightly different from one section thereof to another. Thus, merely because a wire is wound so as to have a certain number of turns does not insure that a predetermined delay of an alternating voltage supplied thereto will be provided.

It is an object of the present invention to provide an improved system for providing coil conductors having predetermined electrical characteristics.

It is a further object of the present invention to provide a system for providing an artificial transmission line having a predetermined time or phase delay.

It is another object of the present invention to provide an improved method of forming coils having predetermined electrical characteristics.

The foregoing and other objects and advantages of the present invention which will become apparent from the detailed description thereof together with the accompanying drawings are attained by winding a length of conductor into the form of a coil while supplying an alternating voltage thereto. Changes in the alternating voltage at an output for said coil as it is formed are ascertained so that the formation of the coil may be ceased at a predetermined time. Thus, a coil having predetermined electrical characteristics may be readily formed.

In forming an artificial transmission line, for example, means are provided for winding an insulated conductor in concentric proximate relationship relative to a further conductor for providing the transmission line. Generating means are provided for supplying an alternating voltage such as a series of recurrent pulses to the conductor as it is formed into a coil. A standard delay device is coupled to said generating means so as to also receive an alternating voltage such as a series of recurrent pulses. The phase or time delay of pulses passing through the standard delay device is compared with the phase or time delay of pulses passing through the coil as it is formed so that when a predetermined time or phase relationship is attained the formation of the coil into an artificial transmission line is ceased. Thus, an artificial line is provided having accurate predetermined phase or time delay characteristics.

Referring to the drawings.

Figure 1:
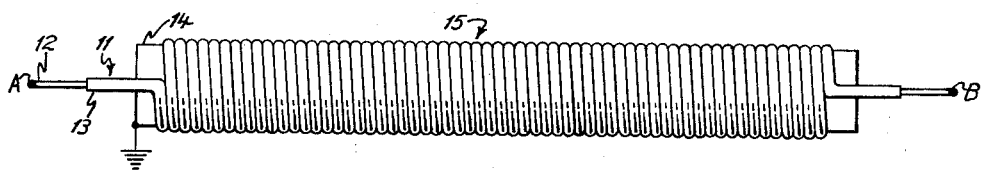
Fig. 1 is a view of an artificial line structure formed in accordance with the present invention.

Referring now to Fig. 1, an insulated wire 11 consisting of a conductor 12 provided with a layer of dielectric insulating material 13 is illustrated as being wound about a form 14 so as to provide a coil or helix 15. The outer surface of form 14 is conductive and grounded as indicated.

Means, not shown, may be provided for supplying high frequency alternating voltage continuous wave or pulse energy between one end of coil 15 at a terminal A and ground. Energy at the other end of coil 15 at a terminal B is delayed in phase or time relative to the energy supplied to terminal A by an amount which is a function of the number of coil turns and other characteristics of the artificial transmission line provided by coil 15 and the conductive form 14 as is known in the art.

Figure 2:
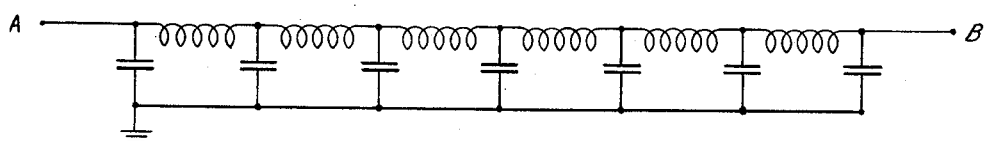
Fig. 2 is a schematic view of the equivalent circuit for the structure of Fig. 1.

The equivalent electrical circuit for the structure shown in Fig. 1 is illustrated in Fig. 2. The series inductances of Fig. 2 are provided by the turns of coil 15, the shunt capacitances being provided by the capacitance between the coil turns and the grounded conductor 14 of Fig. 1. For all frequencies of continuous wave energy or frequency components of pulse energy supplied to the artificial transmission line which are sufficiently below cut-off for the line, the delay per section of line comprising a coil turn, for example, is approximately equal to $\sqrt{LC}$, L and C being the inductance and capacitance, respectively, for each coil section. Thus, the total delay for an artificial line is a function of the number of turns of wire utilized in its formation. However, the total delay is not directly proportional to the number of coil turns as L and C are generally different from one coil turn to another for reasons already mentioned.

Figure 3:
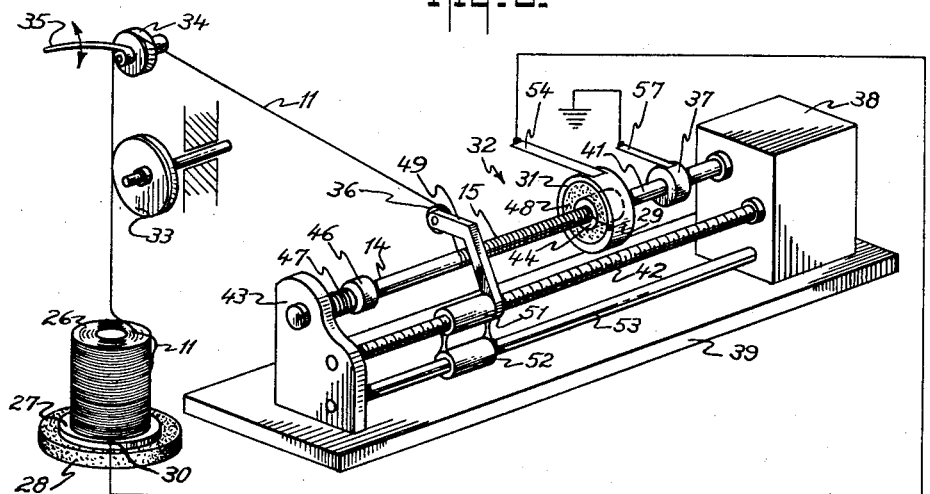
Fig. 3 is a schematic view of the system of the present invention for forming an artificial line as shown in Fig. 1, having a predetermined phase delay characteristic.
Figure 3:
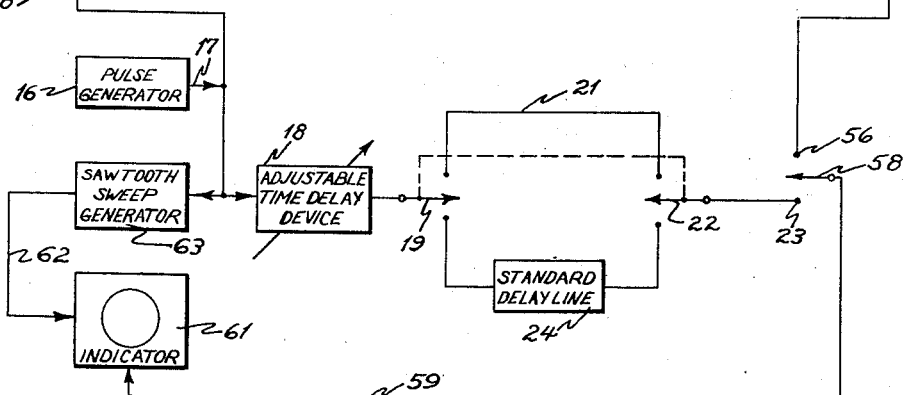

A system for forming an artificial line of the type shown in Fig. 1 so as to provide a predetermined desired delay is illustrated in Fig. 3. Referring to this system, a pulse generator 16 such as a free running blocking oscillator for providing alternating voltage energy in the form of a series of recurrent pulses of substantially fixed repetition rate, for example, has an output lead 17 connected to an input of adjustable time delay device 18 comprising an electronic delay device or an adjustable artificial transmission line, for example. The output of the adjustable delay device 18 is adapted to be connected through a switch arm 19, conductor 21 and a further switch arm 22 ganged to switch arm 19 to an output terminal 23 for one position of switches 19 and 22. A further position for switches 19 and 22 causes the terminal 23 to be connected to the output of the adjustable delay device 18 through a standard delay line 24 for providing a predetermined fixed time delay of input energy supplied thereto. The standard delay line 24 should have electrical characteristics which are similar to those of the artificial transmission line to be formed.

The output lead 17 from pulse generator 16 is also connected at 30 to a conductive base 27 of a metallic spool 26 of the insulated wire 11 of Fig. 1, the spool 26 being insulated from ground by a dielectric member 28. A conductive end 29 of the wire 11 external of the spool 26 is affixed to a metallic slip-ring 31 of a coil winding mechanism 32, the other end of wire 11 being buried within the turns of wire about spool 26. Inherent distributed capacitance between the turns of wire 11 and the outer conductive surface of spool 26 provides sufficient capacitive coupling to effectively connect the wire 11 to spool 26 and point 30 for alternating voltage energy from source 16.

A portion of wire 11 between spool 26 and the wire end 29 is looped around a tensioning pulley 33 supported above the spool 26. A further portion of wire 11 is guided by a pulley 34 held by a resilient member 35 above pulley 33, the pulley 33 being supported by and regulated by suitable tensioning apparatus, not shown. A longitudinally displaceable pulley 36 of the winding mechanism 32 is provided for feeding the wire 11 from pulley 34 to the conductive form 14 supported by the winding mechanism.

The winding mechanism 32 comprises conventional apparatus known in the art for winding coils except for the provision of the slip-ring 31 and a further slip-ring 37. A housing 38 supported on a base 39 is provided for housing a motor, not shown. One end of a metallic shaft 41 is also supported by housing 38 for rotation by the motor therein. One end of a threaded shaft 42 is also supported by housing 38 for rotation by the aforementioned motor, the other end of shaft 42 being supported for rotation in a bracket 43 mounted on the base 39.

A metallic chuck 44 is supported at an end of rotatable shaft 41 for receiving an end of the conductive form 14 about which the insulated wire 11 is to be wound. A bearing 46 loaded by a spring 47 is supported upon bracket 43 is alignment with chuck 44 for receiving the other end of form 14. The spring 47 is provided for permitting the form 14 to be inserted between chuck 44 and bearing 46 and, once form 14 is mounted, to insure that its right-hand end fits snugly within the chuck 44 for rotation thereby.

The slip-ring 31 is insulated from chuck 44 and conductive form 14 by an annular dielectric member 48 adapted to fit tightly around chuck 44 and tightly within slip-ring 31 so that slip-ring 31 will be revolved when the chuck 44 is rotated. The slip-ring 37 fits around shaft 41 so as to conductively engage this shaft and be rotatable therewith.

The pulley 36 for feeding the insulated wire 11 to form 14 is supported by a bracket 49 having a sleeve 51 threaded upon the threaded shaft 42. A further sleeve 52 is affixed to sleeve 51 and telescopes a guide-rod 53 between housing 38 and bracket 43. When the motor within housing 38 is switched on by means, not shown, the shafts 41 and 42 are revolved at predetermined rates. Rotation of shaft 41 causes the slip-ring 31 and conductive form 14 to be revolved so that the wire 11, having one end 29 fixed to slip-ring 31, will be pulled up off of the spool 26, which remains stationary, and wound tightly around form 14. Rotation of shaft 42 is adapted to cause the bracket 49 holding pulley 36 to progressively move away from the housing 38 so that the insulated wire 11 is wound about form 14 from one end to the other, the turns of wire being closely adjacent each other.

A metallic brush 54 is provided for engaging slip-ring 31 so that the end 29 of wire 11 is connected to an output terminal 56. A grounded metallic brush 57 is also provided for engaging slip-ring 37 for electrically grounding the conductive form 14 via chuck 44, shaft 41, slip-ring 37, and the brush 57. If desired, the coupling from slip-rings 31 and 37 to terminal 56 and ground, respectively, could be effected by substituting concentric stationary rings of metal about slip-rings 31 and 37 in closely spaced relationship therewith so as to provide capacitive couplings.

A switch arm 58 is provided for alternately connecting terminals 23 and 56 by way of a conductor 59 to one of the vertical deflecting plates of an oscilloscope indicator 61. A horizontal deflecting plate of indicator 61 is coupled by a conductor 62 to the output of a sawtooth wave generator 63 whose sweep is triggered by the pulses received from the output lead 17 of pulse generator 16. The sweep duration of the voltage waveform provided by generator 63 should be slightly longer than the delay to be provided by the artificial transmission line to be formed. Since a delay to be provided by an artificial transmission line is generally in the microsecond region, the sweep generator 63 and indicator 61 may comprise a synchroscope, i.e., an oscilloscope having a sweep of very short duration, generated only when a synchronizing signal such as a pulse from generator 16 is provided.

The oscilloscope indicator 61 is provided for ascertaining the phase or timing relationship between pulses which appear at terminals 23 and 56. Switch 58 is provided so that pulses at one and then the other of these terminals can be visually compared on the screen of indicator 61 at the same time. If switch 58 is operated by hand, the oscilloscope 61 should have a long persistence screen. Switch 58 could be vibrated mechanically by means, not shown, or it could comprise an electronic switch of any suitable form known in the art, for example.

The method of forming an artificial transmission line as shown in Fig. 1 by the apparatus of Fig. 3 is as follows:

A suitable spool of wire from which the transmission line is formed is located in relationship with the pulleys 33, 34 and 36 as is illustrated in Fig. 3. The output lead 17 from generator 16 is affixed to the metallic spool 27 and the external end 29 of wire 11 is tinned and affixed to the slip-ring 31. The pulse generator 16 is then set into operation and alternating voltage pulse energy is simultaneously applied to the slip-ring 31 through the wire 11 and to the switch 19 through the time delay device 18, the sweep generator 63 being triggered by each pulse from the pulse generator 16.

Prior to setting the winding mechanism 32 into operation, the switch arms 19 and 22 are connected to their upper terminals so that the output from the delay device 18 is connected through conductor 21 to terminal 23. The delay device 18 is then adjusted so that the alternating voltage pulses appearing at terminal 23 from the delay device 18 are in phase with the alternating voltage pulses at terminal 56 from the slip-ring 31. Switch arm 58 is rapidly vibrated between terminals 23 and 56 so that the two traces of the leading edges of the pulses appearing at terminals 23 and 56 will appear simultaneously on the screen of oscilloscope indicator 61. The delay device 18 is adjusted until the 50% amplitude points of the leading edges of the aforementioned two traces are coincident. This balances out any slight inherent delay of the pulses appearing at terminal 56 because of the spool 27 of wire 11 between terminal 56 and generator 16.

Switch arms 19 and 22 are then connected to their lower terminals for connecting the standard delay line 24 between terminal 23 and the adjustable delay device 18. This will cause the leading edge of the trace of the pulses at terminal 23 to be delayed by a further amount determined by the standard delay line 24, the trace thereof on the screen of indicator 61 moving to the right. Next, the winding operation is started with shafts 41 and 42 of the winding mechanism 32 being rotated by the motor, not shown, in box 38. As the wire 11 is wound around the form 14 from the end of form 14 closest to slip-ring 31 to the other end of form 14, the pulses from generator 16 which appear at terminal 56 become delayed by a larger and larger amount. This occurs since the turns of wire 11 about form 14 provide a section of artificial transmission line of increasing length as wire 11 is wound into coil 15. Switch arm 58 is rapidly vibrated between terminals 23 and 56 so that the leading edges of the pulses thereat at both terminals may be compared simultaneously on the screen of indicator 61, the trace of the leading edge of the pulses at terminal 56 moving to the right as coil 15 is formed. When the 50% amplitude points of the traces of the leading edges of the pulses at terminals 23 and 56 are again in coincidence, the winding of wire 11 is stopped. This could be done manually or suitable means, not shown, could be provided for automatic termination of the winding operation at the suitable time. Thus, the transmission line provided by coil 15 has a delay which is substantially equal to the delay provided by standard delay line 24.

In forming an artificial transmission line for providing a delay in the microsecond region, for example, only a small amount of wire 11 about spool 26 is required. Thus, if there is sufficient wire on the spool 11, only a very slight change in delay of the pulses from generator 16 is caused by the removal of the wire 11 from the spool and an artificial transmission line of almost exactly the electrical length of the delay line 24 is provided. A near empty spool of wire should not be employed where high accuracy is required as the change in delay of the pulses from generator 16 as wire is unwound from such a spool would be larger than desired.

Accuracy in forming an artificial transmission line of predetermined length has been found to be exceedingly good without requiring turns counting apparatus nor a complicated automatic tensioning control mechanism. Furthermore, variations in the repetition rate of the pulses provided by generator 16 does not affect the accuracy of providing a line whose delay is within specified limits as a comparison method of the delay of a standard artificial line with the line being formed is employed.

If a tapped or stepped delay line is desired, it is evident that the winding operation could be stopped at various points when the delayed pulses at terminal 56 as indicated on the screen of oscilloscope indicator 61 are delayed by predetermined increments. A junction can then be provided at each point along the wire 11 about the form 14 at which a predetermined increment of delay is provided. Thus, after the complete delay line is wound and removed from the winding system, a multipoint switch may be employed therewith for delaying pulses by a predetermined amount dependent on the setting of the switch.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A system for providing an artificial line network having a predetermined time delay characteristic, comprising pulse generator means for providing recurrent voltage pulses having a predetermined repetition rate, a standard delay means having an input coupled to said pulse generator means for receiving recurrent voltage pulses therefrom, said standard delay means having an output for supplying pulses having a predetermined time delay relative to the pulses received at its input, indicating means having an input for receiving the delayed pulses from said standard delay means for providing an indication of the delay thereof, a length of insulated conductor to be formed as a delay line coil, means coupling said insulated conductor to said generator means for receiving recurrent pulses therefrom which have a predetermined timing relationship relative to the pulses received at the input of said delay means, means including a brush and a slip-ring assembly for connecting an end of said conductor and the delay line coil formed therefrom to said input of said indicating means for supplying pulses thereto after passage along said conductor, and means including said slip-ring assembly for winding said insulated conductor about a conductive form for providing said delay line coil.

2. Apparatus for forming an artificial transmission line, comprising coil winding means, said means including a rotatable chuck member for receiving a conductor about which a wire is to be wound for forming said transmission line, means for grounding said chuck member, a conductive slip-ring in insulated relationship relative to said chuck member for rotation therewith, said slip-ring comprising connecting means for one end of said insulated wire while said wire is wound about said conductor, a source of recurrent pulses, a pair of terminals, means including said slip-ring connecting said length of insulated wire between one of said pair of terminals and said source of pulses, a standard delay device, means coupling said standard delay device between the other of said pair of terminals and said source of pulses, and means having an input for alternate connection to said pair of terminals for comparing the timing relationship between pulses thereat as supplied from said generating means through said wire and standard delay device.

3. Apparatus as set forth in claim 2, further including adjustable means for regulating the timing relationship of pulses supplied from said source of pulses to said wire and to said standard delay device, and switching means between said other of said pair of terminals and said source of pulses for by-passing said standard delay device for synchronizing the timing relationship between the pulses at said pair of terminals prior to winding said length of wire into said coil.

4. A method of forming a coil having predetermined electrical characteristics, comprising the steps of winding a length of wire into a coil while supplying an alternating voltage to one end of said coil and supplying an alternating voltage to a standard delay device, comparing and indicating the phase relationship between an alternating voltage at the other end of said coil and an alternating voltage at an output for said standard delay device as the coil is formed, and terminating the winding of said coil when a predetermined phase relationship is attained.

5. A method of forming an artificial transmission line from a length of insulated wire and a conductor, comprising the steps of winding said wire in concentric relationship relative to said conductor so as to provide a coil in close proximity with said conductor, supplying one end of said coil with a first alternating voltage while supplying the input of a standard phase delay device with a second alternating voltage having a predetermined phase relationship relative to said first alternating voltage as said coil is wound, comparing the phase relationship between alternating output voltages at the output of said phase delay device and the other end of said coil, and terminating the winding of said coil when a predetermined phase relationship between said output voltages is attained.

6. A method for winding artificial delay lines of predetermined electrical length from a spool of insulated wire, comprising the steps of winding said insulated wire into the form of a helix about a conductive form, supplying said spool of wire with a series of recurrent pulses for travel from one end to the other end of said helix as it is formed while supplying a standard delay device with a series of recurrent pulses having a predetermined timing relationship relative to the first mentioned series of recurrent pulses as said helix is wound, comparing the timing relationship between a series of output pulses from said standard delay device and the other end of said helix as said helix is being formed, and ceasing the winding of said wire when a predetermined timing relationship between said delay device and helix output pulses is attained.

7. In combination, means for producing a series of recurrent pulses, means for winding a coil for providing an artificial delay line, said last-named means having an input end for applying said pulses to said coil and an output end for obtaining delayed pulses from said coil, a standard delay line having an input end for receiving said pulses and an output end whereat delayed pulses are provided, and means for comparing the pulses from said artificial delay line and said standard delay line for determining the relative delay therebetween.

References Cited in the file of this patent
UNITED STATES PATENTS

| | | |
|---|---|---|
| 1,445,260 | Adams | Feb. 13, 1923 |
| 1,921,869 | Ewald | Aug. 8, 1933 |
| 2,645,429 | Scott et al. | July 14, 1953 |
| 2,666,179 | Maxwell | Jan. 12, 1954 |
| 2,677,804 | Foster et al. | May 4, 1954 |
| 2,697,559 | Scarce et al. | Dec. 21, 1954 |
| 2,717,358 | Munster | Sept. 6, 1955 |